(No Model.) 3 Sheets—Sheet 2.
J. DEAN.
MARINE CONVEYANCE.
No. 547,422. Patented Oct. 8, 1895.
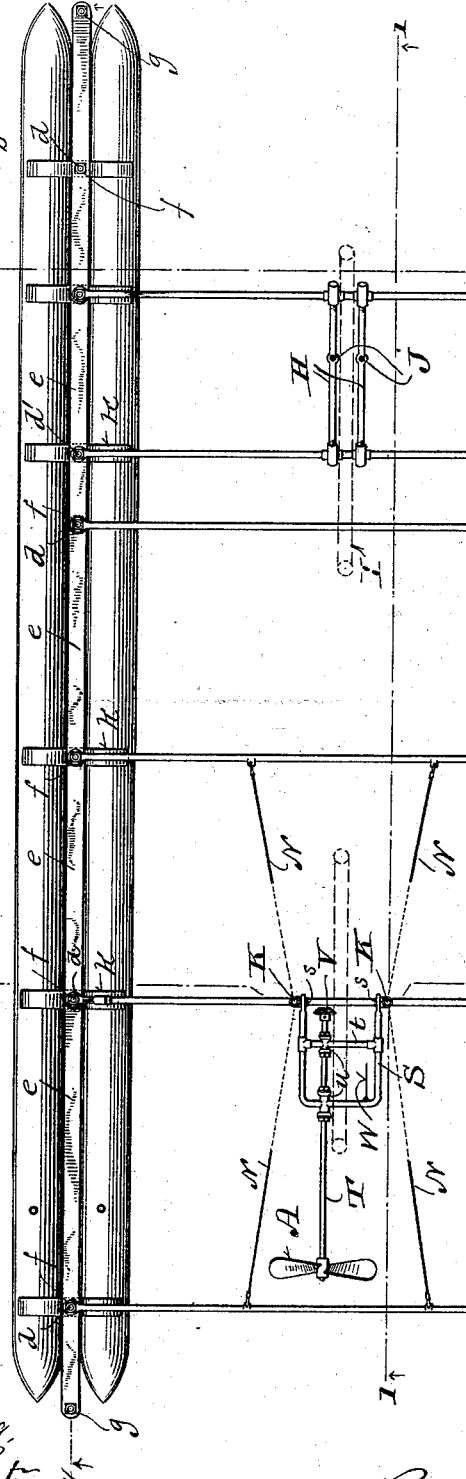
Witnesses:
Geo. W. Young.
N. E. Oliphant.
Inventor:
John Dean
H. G. Underwood
Attorneys.

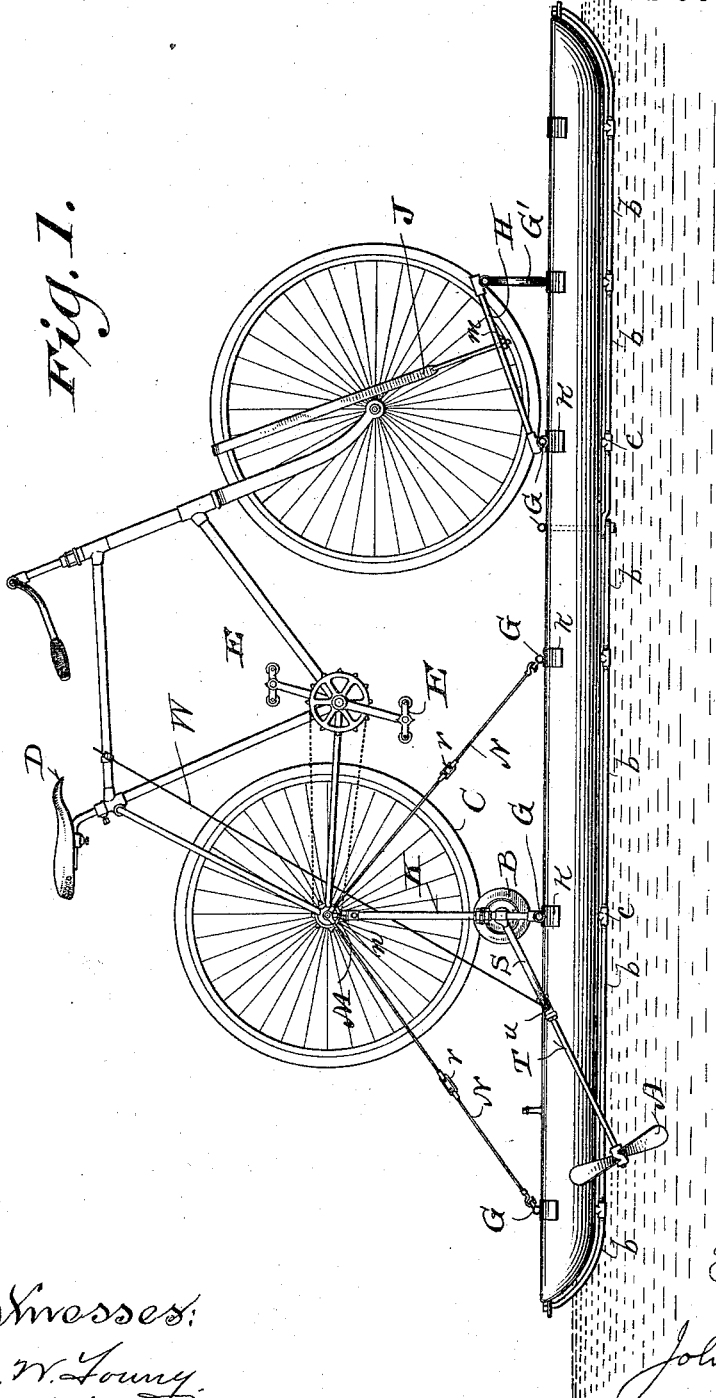

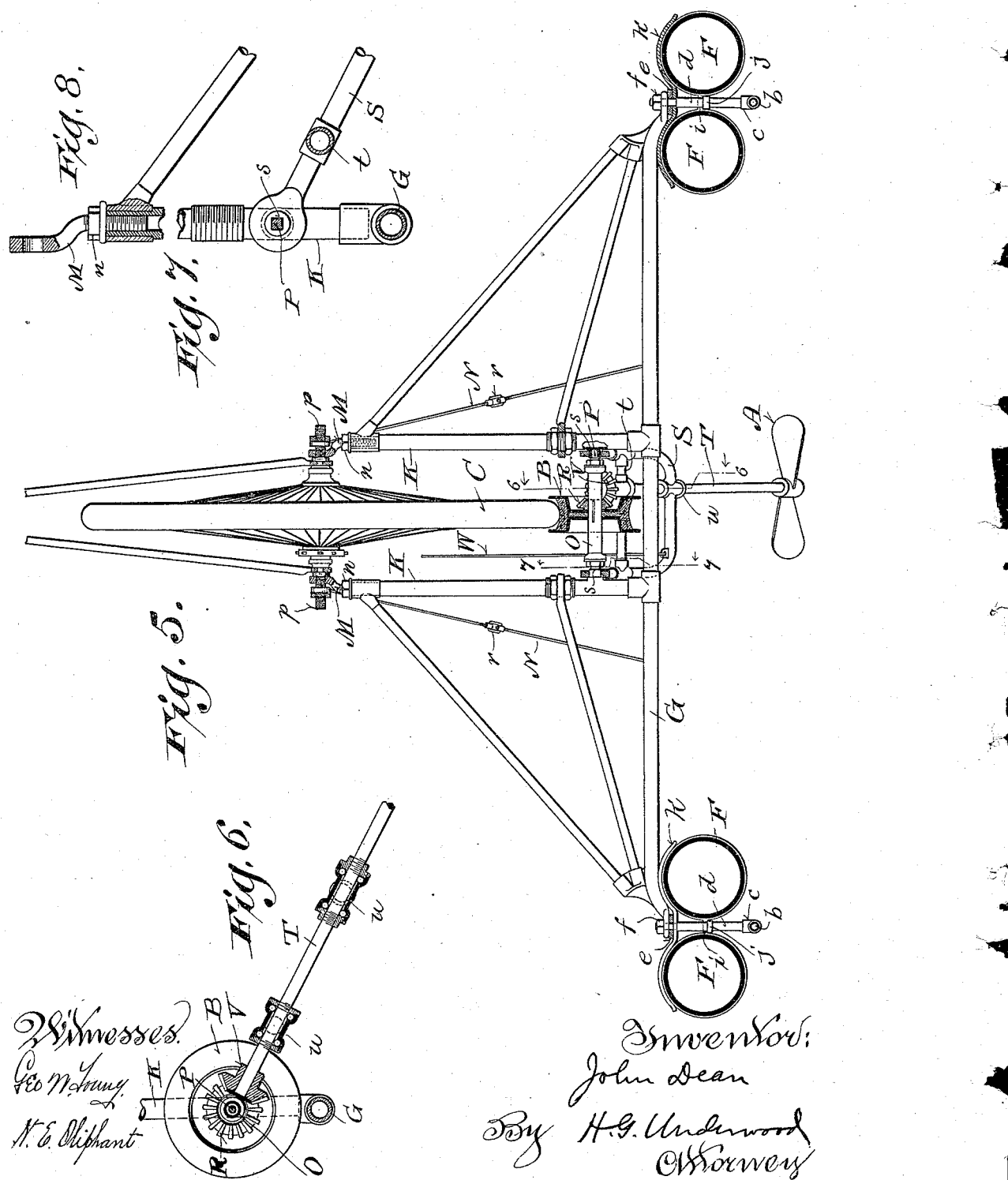

UNITED STATES PATENT OFFICE.

JOHN DEAN, OF RACINE, WISCONSIN.

MARINE CONVEYANCE.

SPECIFICATION forming part of Letters Patent No. 547,422, dated October 8, 1895.

Application filed December 19, 1894. Serial No. 532,285. (No model.)

*To all whom it may concern:*

Be it known that I, JOHN DEAN, a citizen of the United States, and a resident of Racine, in the county of Racine and State of Wisconsin, have invented certain new and useful Improvements in Marine Conveyances; and I do hereby declare that the following is a full, clear, and exact description thereof.

My invention has for its object to utilize a bicyle as the motor for actuating propulsion mechanism of a raft, as well as to provide such a craft that may be readily taken apart and packed with its propulsion mechanism in small compass, the weight of the package being such that it may be conveniently carried on a bicycle or by the rider of the same when traveling on land. Hence said invention consists in certain peculiarities of construction and combination of parts pertaining to said raft, its propulsion mechanism, and the means for connecting the same with said bicycle, as will be hereinafter described with reference to the accompanying drawings, and subsequently claimed.

In the drawings, Figure 1 represents an elevation of a combined bicycle and raft as viewed on line 1 1 of the succeeding figure; Fig. 2, a plan view of the raft having parts thereof in horizontal section; Fig. 3, a transverse section taken on line 3 3 of the preceding figure; Fig. 4, a detail elevation having parts thereof in section on line 4 4 of Fig. 2; Fig. 5, a transverse section on line 5 5 of said Fig. 2, the bicycle being in working position; Figs 6 and 7, detail sectional views, respectively, taken on lines 6 6 and 7 7 of Fig. 5; and Fig. 8 a detail sectional view illustrating one of a pair of adjustable supports involved in my invention.

According to my invention, in its broadest sense, I provide a raft, of any suitable construction, with a suitable propulsion mechanism—such, for instance, as the propeller-wheel A herein shown—and gear the same with a friction-drum B, arranged to rotate on said raft. I then mount a bicycle of the safety type in fixed position on the raft and have the rear wheel C of said bicycle in contact with the friction-drum, whereby a person astride of the bicycle-saddle D and working the crank-pedals E in the usual manner may propel the whole. Various means, under the control of the operator may be employed to steer the craft above specified, and provision may be made for raising and lowering the propulsion mechanism at the will of said operator.

In order to provide a raft that may be readily taken apart and packed together in small compass for transportation on a bicycle or by the rider thereof, I utilize a main frame embodying a series of detachably-united posts, plates, and tube-sections of light metal, inflatable floats of sufficient flexibility to permit of their being folded or rolled up when deflated, and various braces, supports, and stays. In addition to these raft elements I utilize an auxiliary frame attachable to the main one, a propeller-wheel having its shaft in bearings in the auxiliary frame, a friction-drum capable of being positioned to turn on said main frame, and gear-wheels for connecting the propeller-wheel and friction-drum. In case the auxiliary frame is designed for raising or lowering in order to regulate the submergence of the propeller-wheel I shall also employ suitable means for controlling the same by a person mounted on the bicycle when the latter is in fixed position on the collapsible raft.

The following description refers particularly to the accompanying drawings and defines the structural detail embodied in one form of my invention. A series of horizontal tube-sections *b* are in screw connection with couplings *c* at the lower ends of posts *d*, and reduced upper ends of a majority of these posts engage eyes in overlapping longitudinal plates *e*, the latter being held on said posts by nuts *f* or other suitable means. The end tube-sections are curved upward after the manner of the bow of a boat and engaged with eyes in the end plates, nuts *g* or other suitable means being employed to maintain the union. By means of the construction and arrangement of parts just specified I provide a knockdown-truss, and in the construction of the raft I employ two such trusses parallel to each other any suitable distance apart, each of said trusses being preferably in two sections, having hinge connection with each other, as shown in Figs. 1 and 4, an additional post *d'* being employed to stiffen the forward truss-section adjacent to its hinge-joint. Inflatable floats F, consisting of waterproof canvas sheaths containing inflatable rubber tubes, are connected in pairs by a web $i$, having openings engaged by the truss-posts $d\ d'$, and collars $j$ on said posts oppose the under side of the web. Transverse plates $k$ on the truss-posts $d\ d'$, under the plates $e$, overlap the twin floats to hold the same so that their connecting-webs will be held down against the collars on said posts, as herein shown. Transverse tubular braces G have eyes in their ends engaged with the truss-posts $d\ d'$, between the plates $e$ and nuts $f$, and one of the braces G' is elevated for the most part above the others in the series. This elevated brace and the one immediately in its rear are coupled to a pair of longitudinal stays H, and in practice the front wheel I of the aforesaid bicycle is held on said braces between the stays by means of a yoke J, having the ends thereof extended through eyes in said stays and secured by nuts $m$ or other suitable means. The trusses being in hinge-joined sections and the front wheel of the bicycle held between the stays H, connecting the braces G G', joining the forward sections, the raft may be steered by manipulation of the bicycle handle-bar. To one of the tubular braces connecting the rear sections of the trusses I couple tubular stanchions K, and stiffen the latter by means of tubular stays, as best illustrated in Fig. 5. Engaging the upper ends of the stanchions K are the screw-threaded shanks of eyes M, held in vertical adjustment by means of set-nuts $n$, these eyes being for the engagement of steps $p$ on the rear axle of the aforesaid bicycle. By means of the vertically-adjustable supports just specified the pressure of the rear bicycle-wheel C on the friction-drum B may be regulated and compensation afforded for wheels of variable diameter within certain limits. Fore-and-aft stays N, jointed by turn-buckles $r$, are detachably connected to the bicycle-steps $p$ and transverse braces G of the raft, the rigidity of these stays being regulated by the adjustment of their turn-buckles.

The friction-drum B has its hub keyed to a sleeve O in ball-bearing connection with a shaft P, having squared ends engaging the corresponding bores of lateral sockets $s$ on the stanchions K, and a bevel gear-wheel R is also keyed on said sleeve. Loose on the sockets $s$, extending laterally from the stanchions K, are eyes in the ends of a tubular yoke S, having a transverse brace $t$ and constituting a frame auxiliary to the main frame comprising the trusses, braces, said stanchions, and the various stays above specified.

The pivotal auxiliary frame is provided with ball-bearings $u$ for the shaft T of a propeller-wheel U, and fast on the inner end of the shaft is a bevel gear-wheel V in mesh with the one R aforesaid.

The submergence of the propeller-wheel is governed by a suitable hanger W in hook or clamp connection with a reach member of the bicycle-frame, as shown in Fig. 1, this connection being in easy reach of the operator astride of the bicycle-saddle.

Various changes may be made in the matter of structural detail of my collapsible raft, and whether the raft be collapsible or otherwise, I do not wish to be understood as limiting myself to the particular means herein set forth for communicating motion from the bicycle to the propulsion mechanism of said raft.

Having thus described my invention, what I claim as new, and desire to secure by Letters Patent, is—

1. A portable raft comprising parallel knock-down trusses each of which has a hinged forward section, transverse braces joining the trusses, bicycle-supports and propulsion-mechanism in connection with the frame embodying said trusses, braces and supports; inflatable flexible floats secured to the trusses, suitable means for transmitting power from a bicycle on the raft to said propulsion-mechanism, and other suitable means for insuring deflection of said forward portion of the raft incidental to movement of the handle-bar of said bicycle.

2. A raft provided with pivotally adjustable propulsion-mechanism, a bicycle arranged on the raft, suitable means for communicating motion from the bicycle to the propulsion-mechanism, and a hanger for this propulsion-mechanism in adjustable connection with said bicycle adjacent to the saddle of the same.

3. A raft comprising a main-frame, an auxiliary-frame in pivotal connection with the main one, a propeller wheel having its shaft in bearings on the auxiliary frame, suitable means for communicating motion from a bicycle on the raft to the propeller-wheel shaft, and other suitable means for regulating the adjustment of said auxiliary frame.

4. A portable raft comprising a knock-down frame consisting of hinge-joined sections and inflatable flexible floats in detachable connection with the frame, bicycle supports and stays on the frame, a propulsion-mechanism attachable to said frame, and suitable means for communicating motion from a bicycle on the raft to said propulsion-mechanism.

5. A raft provided with propulsion-mechanism, a friction-drum in gear with the propulsion-mechanism, stanchions on the raft, and supporting devices having vertical adjustable connection with the stanchions, whereby a portion of a bicycle engaged with the supports may be raised or lowered to regulate the contact of its driven wheel with said friction-drum.

6. A portable raft comprising a knock-down frame and inflatable flexible floats, a pair of parallel longitudinal stays connected to transverse forward brace-members of the frame, a clamping yoke joined to the stays, stanchions rising from said frame, a propulsion-mechanism for the raft, and suitable means for communicating motion to this mechanism from a bicycle mounted on the stanchions and front brace members of said frame, the stays and clamping-yoke serving to secure the front wheel of said bicycle.

In testimony that I claim the foregoing I have hereunto set my hand, at Racine, in the county of Racine and State of Wisconsin, in the presence of two witnesses.

JOHN DEAN.

Witnesses:
SPENCER HALL,
WALLACE EASSON.